United States Patent
Jacobsen (10) Patent No.: US 8,812,399 B2
(45) Date of Patent: Aug. 19, 2014

(54) MOBILE CONSUMER-TO-CONSUMER PERSONAL POINT OF SALE SYSTEM AND RELATED BUSINESS METHOD

(75) Inventor: Jeffrey J. Jacobsen, Hollister, CA (US)

(73) Assignee: Kopin Corporation, Westborough, MA (US)

( * ) Notice: Subject to any disclaimer, the term of this patent is extended or adjusted under 35 U.S.C. 154(b) by 1136 days.

(21) Appl. No.: 12/152,458

(22) Filed: May 14, 2008

(65) Prior Publication Data

US 2008/0288408 A1   Nov. 20, 2008

Related U.S. Application Data

(60) Provisional application No. 60/930,275, filed on May 14, 2007.

(51) Int. Cl.
*G06Q 99/00*   (2006.01)
*G06Q 30/06*   (2012.01)
*G06Q 30/02*   (2012.01)
*G06Q 40/00*   (2012.01)

(52) U.S. Cl.
CPC .......... *G06Q 30/06* (2013.01); *G06Q 30/0631* (2013.01); *G06Q 2220/00* (2013.01); *G06Q 30/0222* (2013.01); *G06Q 30/0601* (2013.01); *G06Q 40/12* (2013.12)
USPC .............. 705/50; 705/26.1; 705/26.7; 705/39

(58) Field of Classification Search
USPC ..................................... 705/26.1, 26.7, 50, 39
See application file for complete search history.

(56) References Cited

U.S. PATENT DOCUMENTS

| | | | |
|---|---|---|---|
| 6,029,141 A | 2/2000 | Bezos et al. | |
| 6,401,085 B1 | 6/2002 | Gershman et al. | |
| 6,675,153 B1 * | 1/2004 | Cook et al. ...................... | 705/74 |
| 6,912,505 B2 * | 6/2005 | Linden et al. .............. | 705/14.53 |
| 6,963,850 B1 * | 11/2005 | Bezos et al. ................. | 705/7.29 |
| 6,980,962 B1 * | 12/2005 | Arganbright et al. ...... | 705/14.31 |
| 8,306,874 B2 * | 11/2012 | Morgenstern et al. ....... | 705/27.1 |
| 2003/0220837 A1 | 11/2003 | Asayama | |
| 2004/0111360 A1 * | 6/2004 | Albanese ........................ | 705/38 |
| 2004/0203363 A1 * | 10/2004 | Carlton et al. .............. | 455/41.2 |
| 2005/0234781 A1 * | 10/2005 | Morgenstern et al. .......... | 705/26 |
| 2007/0067297 A1 * | 3/2007 | Kublickis .......................... | 707/9 |
| 2007/0250390 A1 * | 10/2007 | Lee et al. ........................ | 705/14 |
| 2008/0188207 A1 * | 8/2008 | Lee ............................ | 455/414.1 |

\* cited by examiner

*Primary Examiner* — James D Nigh
(74) *Attorney, Agent, or Firm* — Hamilton, Brook, Smith & Reynolds, P.C.

(57) ABSTRACT

A business method for mobile commerce includes a first buyer purchasing an item from a Internet-based vendor using a first mobile computing device. A shopping history is developed. A second buyer, using a second mobile computing device, interrogates the shopping history of the first buyer to discover certain parameters regarding an article of interest to the second buyer owned by the first buyer. The item is then purchased by the second buyer using shopping history information provided by the first mobile computing device. The method also includes electronically transferring funds to the vendor with at least some of the funds being electronically transferred to the first mobile consumer as a referral fee.

37 Claims, 9 Drawing Sheets

MOBILE CONSUMER-TO-CONSUMER PERSONAL POINT OF SALE SYSTEM AND RELATED BUSINESS METHOD

RELATED APPLICATIONS

This application claims the benefit of U.S. Provisional Application No. 60/930,275, filed May 14, 2007, which also relates to U.S. patent application Ser. No. 12/008,114, filed Jan. 8, 2008, and U.S. patent application Ser. No. 12/008,104, filed Jan. 8, 2008. The entire teachings of the above application(s) are incorporated herein by reference.

BACKGROUND OF THE INVENTION

Although Internet commerce today is both easy and powerful, effort spent and time lost searching the Internet for product and service pricing and availability presents a major detraction and can cause online purchasing often to be fraught with difficulties. Although finding a low price is very important to Internet buyers and often a major factor in the online purchasing decision, other parameters are also very important, such as vendor reliability and security. Many online buyers would sacrifice saving and forgo the lowest price, or may even pay more, in order to ensure a secure transaction and prompt shipping of the desired items or services.

In addition, a new generation of wireless computing products is coming to market with substantial memory capabilities and wireless interfaces, such as cellular and Wi-Fi™, to remotely communicate with the Internet that can enable electronic commerce between a user and a website in a remote manner. Many users are carrying consumer payment providers are now using mobile phones as a payment device by enabling the user to simply transmit payment information to a terminal directly from the wireless device to pay for an item. The mobile phone can also include a personal database with exceptional wireless connectivity and the ability to store vast amounts of digital information.

Internet consumers often will purchase items after obtaining information about products and services from other consumers by word of mouth. This information may include price, quality and reliability of goods or services, and shipping, warranty, transaction security and other information that the consumer generally can not readily obtain from a vendor by, for example, inspecting the vendor's webpage. Moreover, the vendor's website information often can be difficult to navigate, place pertinent information on remote pages and provide information that may vary in accuracy with regard to the actual customer experience.

Consumers do not wish to perform exhausting amounts of searching by reading countless reviews, blogs and consumer review sites, may of which often charge a fee to access relevant information, to obtain this information. This is true especially if friends or consumers located close by already have this information.

Accordingly, there is a need in the art for a wireless mobile business method that remedies these known problems in the art.

SUMMARY OF THE INVENTION

A business method for selling good or services in a wireless manner is provided. The business method provides a first mobile computing device having a first processor, a first memory, and a first wireless interface. The method also includes providing a second mobile computing device having a second processor, a second memory, and a second wireless interface.

A shopping history is stored in the first memory from a purchasing history of an entity associated with the first mobile computing device. An identification of source and an identification of cost of the shopping history is stored. The identification of source provides a wireless link to at least one vendor across the Internet associated with each item in the shopping history.

The link is configured to communicate a purchase order to the vendor and a shipping destination. The method also has the step of purchasing a designated item. The purchase can be by an entity associated with the second mobile computing device. The purchase uses information from the shopping history. The second entity selects an item in the shopping history to purchase using a software application on either the first or the second mobile computing device.

The item is shipped from the vendor to the entity associated with the second mobile computing device. Funds are transferred from the entity associated with the second mobile computing device to the vendor. A referral fee is paid to the entity associated with the first mobile computing device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

A shopping history of personal purchase data is generated and recorded. The history is from an Internet-based buyer, and from purchases made over the Internet. Data for later retrieval, including items that are purchased, cost, and the source, is stored. on After a period of time, even weeks or months later, the Internet purchase of the exact same item (e.g., goods, content or service) can be made by a second different entity. This can be from the same Internet vendor or a different vendor. The second different entity may be a friend, acquaintance, or relative of the first Internet-based buyer. The method provides that a friend or acquaintance, or any other individual does not have to search countless webpages to obtain the same bargain. Instead, a second buyer can use a second mobile computing device, such as a second Smartphone or a second mobile computer having a wireless connection, to immediately purchase the item from the Internet-based vendor using the history information stored on the first mobile device. In another embodiment, the first buyer may only assist the second buyer with purchasing the item from a vendor.

To purchase in a wireless manner, the second device collaborates with the data of the first device. The second buyer runs a software application that is run on the second mobile computing device, or merely taps an icon on a touch screen. Using the shopping history information and source information associated with the first computing device, the second buyer may purchase the same item. Thereafter, the goods, such as a pair of jeans, can be shipped from the Internet-based vendor to the entity associated with the second mobile computing device. Funds are also transferred from the entity associated with the second mobile device to the Internet-based vendor. The method also includes payment of a referral fee, a royalty, or other benefit. The referral or bonus is paid or otherwise transferred to the first Internet-based buyer in exchange for the referral and subsequent sale. Preferably, the buyer only consults one to two or more pages of data to accomplish the sale, and may purchase using one to two or more clicks.

Figure 1:
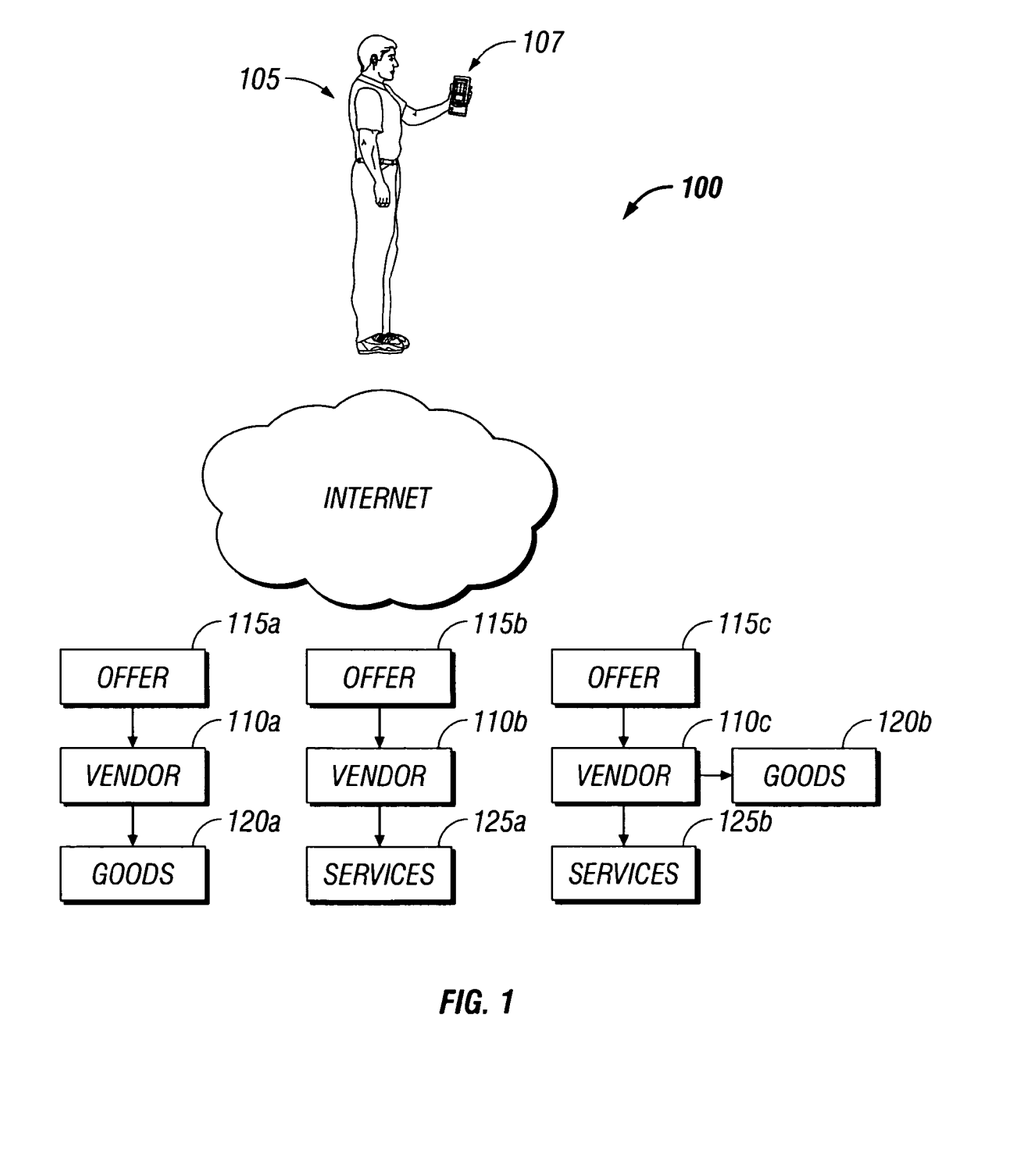
FIG. 1 shows a schematic of an Internet system including a buyer having a first mobile computing device and a number of vendors providing competing offers for goods, services, and digital content that are displayed on the first mobile computing device over the Internet.

FIG. 1 illustrates a system 100 including a first buyer 105 with a mobile computing device 107 and a number of Internet-based sellers 110a-110c (and up to and including any other number of Internet-based sellers 100n that are located on servers, or accessible on a network, or on the World Wide Web (WWW)). Each Internet seller 110a-110c can be located on specific Internet domains and accessed using HTTP or any other request/response protocol between clients and servers on the WWW, or on a local network such as, for example, in an amusement park. Each of the Internet-based sellers 110a-110c includes a related webpage (not shown) that includes graphics, audio, and text, or other multimedia that is suitable to form an offer 115a-115c for the sale of goods 120a, 120b or services 125a, 125b that the Internet-based seller 110a-110c is selling, or otherwise offering for sale on the Internet.

Figure 2:
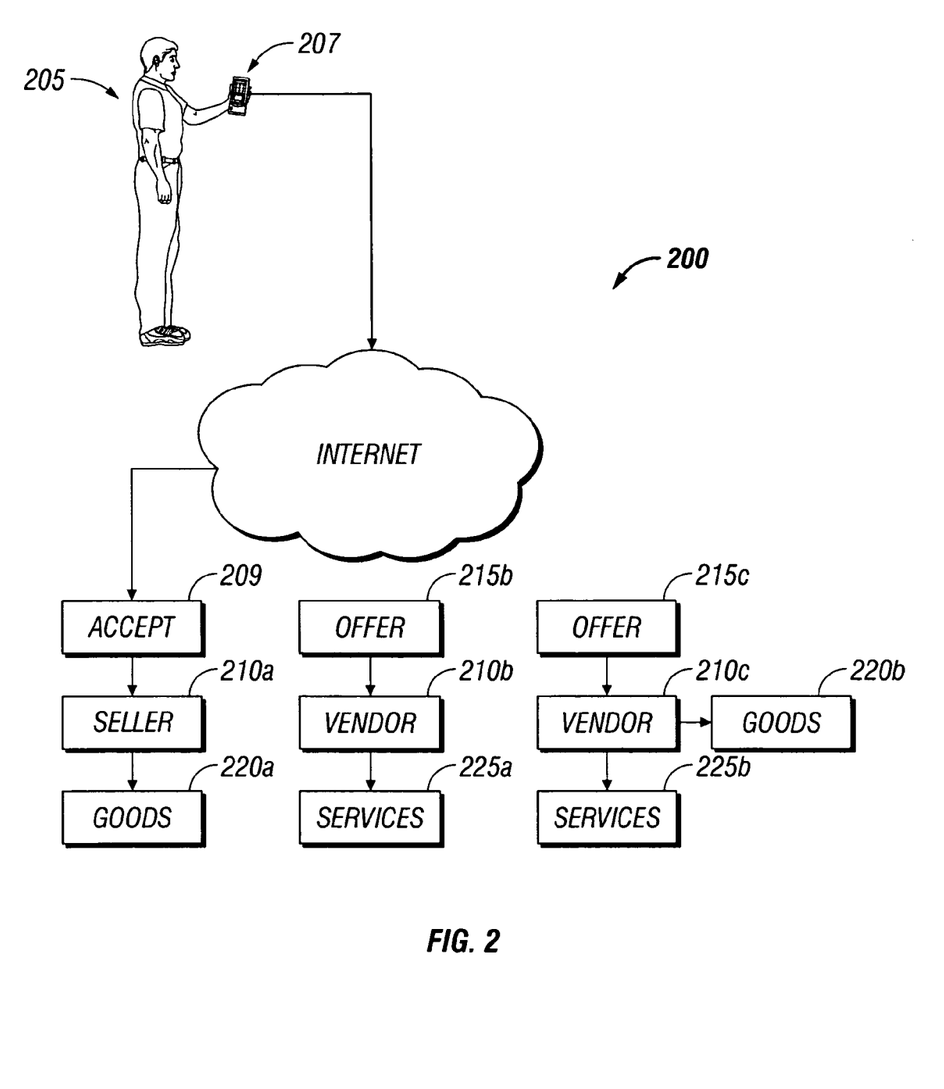
FIG. 2 shows a schematic of the buyer accepting a best competing offer for goods.

FIG. 2 illustrates purchasing interaction 200 between a first buyer 205, using a first mobile computing device 207, and an Internet seller 210a. The computing device 207 preferably includes a processor, a memory, and a wireless communication interface (as illustrated below with reference to FIG. 5) to access a wireless hot spot, or wireless communication network. The memory may further include any operating system including any wireless browser suitable to transmit data using, for example, a secure Wireless Application Protocol.

In this interaction 200, the first Internet buyer 205 can access a hotspot or a wireless service provider. In this example embodiment, the buyer 205 may select a desired good, or item 220a. The first Internet buyer 205 may provide a response, such as, for example, through a WWW browser of running on the mobile computing device 207, to provide a signal to accept 209 the offer 115a from the Internet seller 210a for the goods 220a. In this aspect, the mobile computing device 207 preferably includes a software application that can store parameters of the transaction between the buyer 205 and the Internet seller 210a in a secure manner either locally or remotely. These parameters can include source information, such as a hyperlink to the Internet seller's website and specifically to the specific web page that the item/service is offered. Other transactional item parameters can include transaction information, such as sale price, shipping information, item color, item size, number of items, and any other pertinent information that would be needed to replicate the Internet transaction in an automatic and rapid manner from the wireless computing device 207, or any other mobile device. Preferably, the software application conducts this information storage/retrieval in a secure manner that is not readily visible to the buyer 205. This may also occur in an automatic and in a repeated manner as shopping occurs. It should be appreciated that that goods or services can be purchased using the wireless computing device 207, or purchased using the wireless computing device in combination with other remote computing devices, such as an Internet-based server to transact the sale. A server may also store the shopping history of the buyer 205.

As more and more items are purchased, the software application will develop a shopping history in the memory for the first mobile computing device 207. The shopping history is recorded in an accessible data format of transactional information and Internet source information. This is stored for each of the purchased items in a seamless manner as the shopping occurs. It should be appreciated that the application may be integrated into the browser of the computing device 207, integrated into an operating system of the computing device 207, or stored in memory of the computing device 207 in a manner that is separate from the browser, and/or separate from the operating system. Software application may be downloaded from a website for free, may be installed in the wireless device 207, may be purchased by the buyer 205, or even may be downloaded before, during, or after the transaction between the buyer 205 and the Internet seller 210a.

An example of the recorded shopping history follows. The first Internet buyer 205 can purchase an electronic device for $149.00 from BESTBUY.COM®. The computing device 207 will open an application and record an identification of the electronic device, such as, for example, an APPLE I-POD®; the cost, $149.00 for the item; and the hyperlink to the page on the BESTBUY.COM® website for later retrieval in a memory (e.g., memory 555a of FIG. 5). Icons representing these items also may be generated for ease of use. Other transaction parameters may include a number of items desired, payment information, shipping information, rebate or discount information, and a delivery date and may be different depending on the type of goods, real estate, or services bought and sold.

A week later, for example, the first Internet buyer 205 can purchase a pair of trousers for $88.00 from a different merchant, such as, BROOKSBROTHERS.COM®. The computing device 207 will open the application and record an identification of the trouser including the size, color, and specific identifying parameters; the cost for the item, $88.00; and the hyperlink to the exact page on the website also for later retrieval in the memory (e.g., memory 555a of FIG. 5). These may be recorded in database.

Finally, a month later, the first Internet buyer 205 can still further purchase another item, or can purchase a watch for $500.00 from a store on EBAY.COM®. The computing device 207 will open the application and record an identification of the watch including the style, the mark, and other parameters; the cost for the item, $500.00; and the hyperlink to the page on the website also for later retrieval in a memory of the computing device 207.

Figure 3:
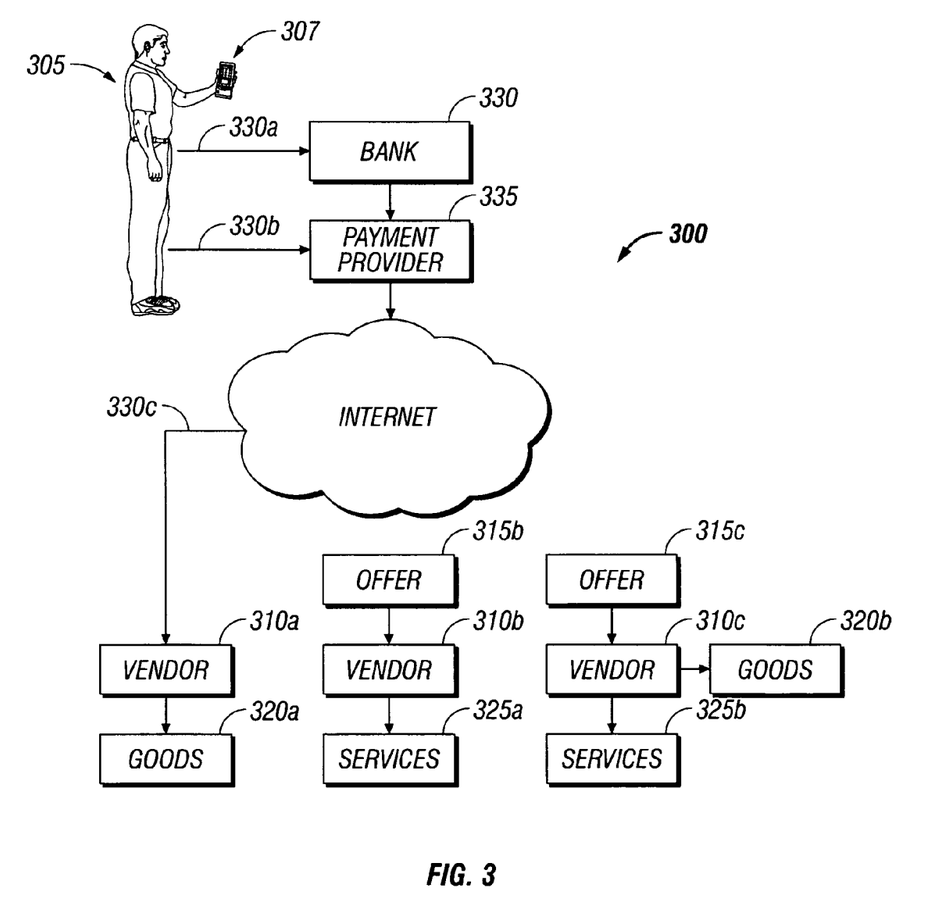
FIG. 3 shows a schematic of the buyer transferring funds from a financial institution to a payment provider, and the payment provider electronically transferring the funds to the vendor.

FIG. 3 illustrates further interaction 300 between a buyer 305 and an Internet seller 310a. The buyer 305 may communicate 330a, 330b payment information via a wireless Internet connection directly to either a financial institution 330 or a payment provider 335, respectively. Thereafter, the payment provider 335 may communicate 330c an authorization across an Internet connection to the vendor 310a. In another embodiment, the buyer 305 signals 330b the payment provider 335 along path to pay 330c immediately. In yet another embodiment, installment payment options are possible between the buyer 305 and Internet-based seller 310a. Funds may be paid directly without a bank 330 or without a payment provider 335. Various payment configurations are possible and within the scope of the present disclosure.

Figure 4:
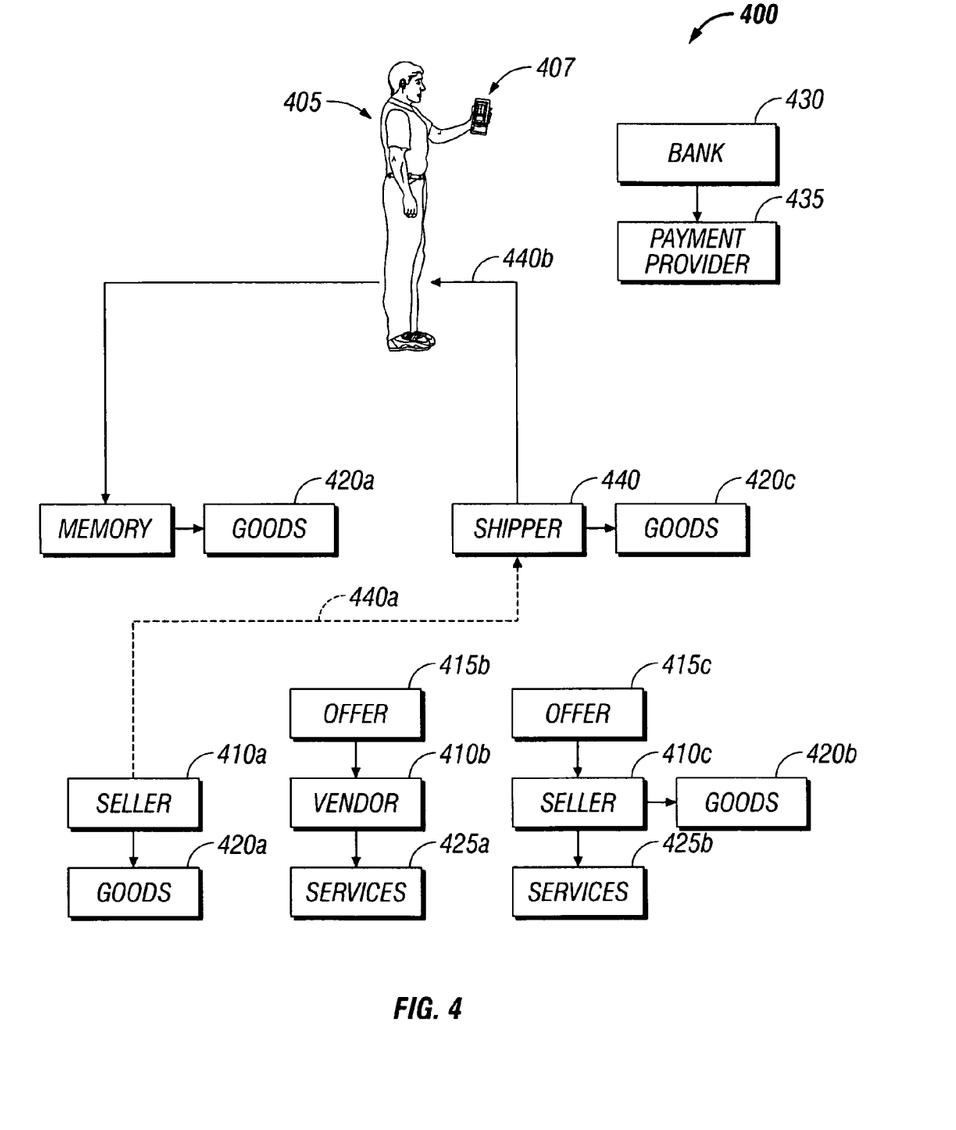
FIG. 4 shows the Internet-based vendor accepting the funds and communicating to a shipper to deliver the goods to the buyer to complete the transaction, and the memory of the first mobile computing device automatically recording the cost and the source for the Internet-based transaction.

FIG. 4 illustrates a shipment diagram of the item 420a progressing from the Internet seller 410a to the buyer 405. In this example embodiment, the vendor 410a delivers 440a the desired goods 420a to the shipper or third party supplier 440. In one embodiment, the shipper 440 may receive the goods or already have the goods 420a. In another embodiment, the shipper 440 can receive the delivered goods from the vendor 410a, or from a different third party (not shown).

The supplier 440 may then deliver 440b the goods 410a to the buyer 405, for example, within an agreed period of delivery time. A software application run on a mobile computing device 407 also may receive a signal from the supplier 440 or the vendor 410, for example, in the format of an electronic message, indicating delivery 440b of the goods. This delivery parameter also may be recorded in memory of the remote computing device 407. It should be appreciated that in the form of digital content, no shipper is required, and the content may be downloaded in an immediate manner.

Figure 5:
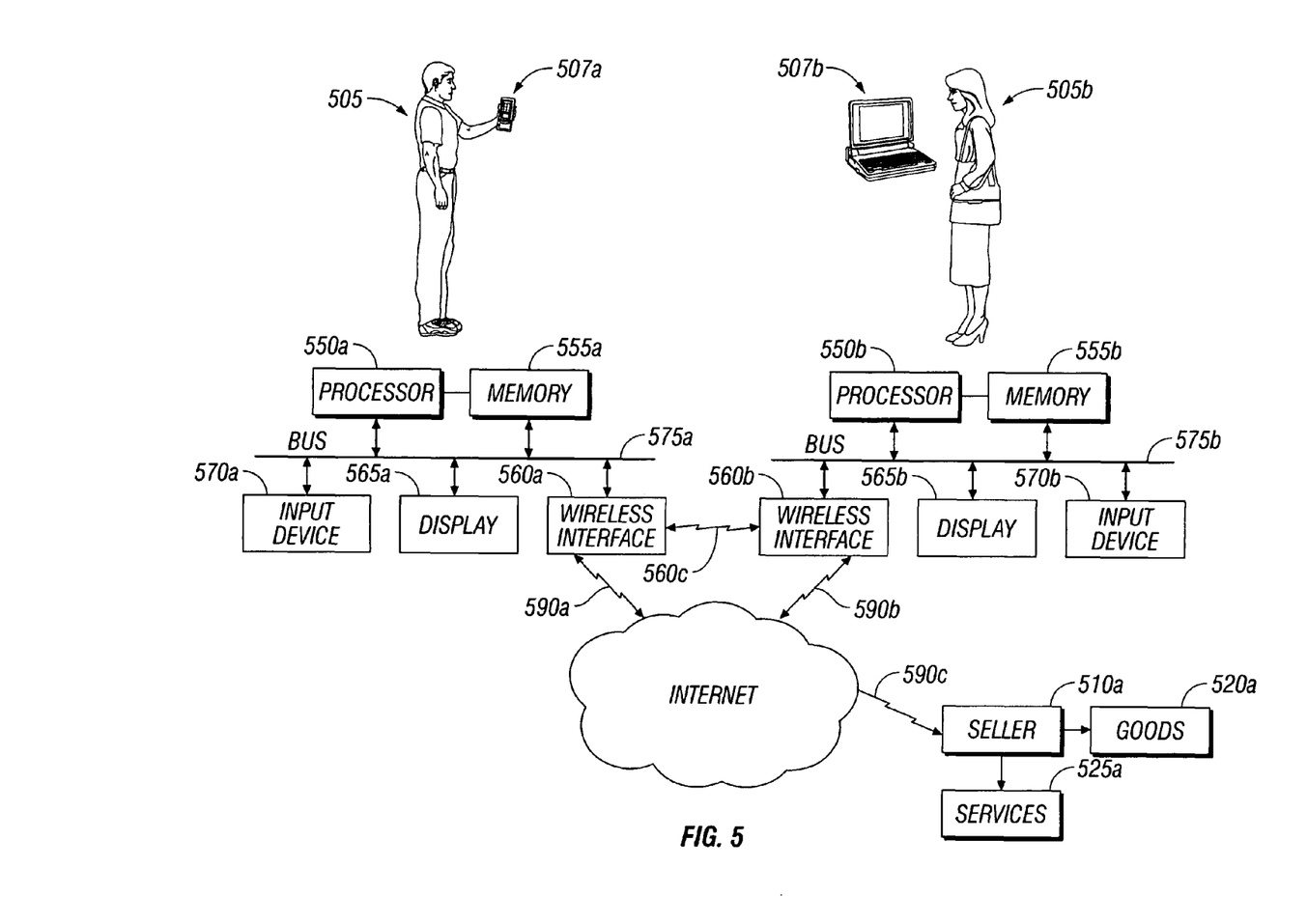
FIG. 5 shows a configuration with a second buyer including a second mobile computing device with a wireless interface that communicates with the first mobile computing device to obtain the cost and the source information for the item for a second electronic transaction.

FIG. 5 illustrates communication between a first Internet buyer 505a and a second Internet buyer 505b, such as a friend of the first Internet buyer 505a. As mentioned above, the first buyer 505 includes a first mobile computing device 507a that includes a processor 550a, a memory 555a, a wireless interface 560a, a display 565a, and an input device 570a all of which are connected to a peripheral component bus 575a. The second buyer 505 also includes a second mobile computing device 507b that includes a processor 550b, a memory 555b, a wireless interface 560b, a display 565b, and an input device 570b, all of which are connected to a bus 575b.

The second buyer 505b may visually inspect or notice the first buyer's 505 clothes or other goods (e.g., goods 420a of FIG. 4) that are in the buyer's 505 possession such, as a watch. Based on the inspection, the second Internet buyer 505b may wish to purchase the same item in an immediate manner. In other embodiments, the second buyer 505b may learn about the goods 520a already purchased by the first buyer 505 by reading, informal communication, e-mails, visual observation, word of mouth communication, or any other audio or visual manner.

Although the second Internet buyer 505b may purchase goods by reviewing multiple Internet pages, it may take substantial amounts of time to review multiple offers (e.g., offers 110a-110c, 110n of FIG. 1). This time consumption may be eliminates by the second Internet buyer 505b communicating with the first Internet buyer 505a who has already spent this time, for example, performing product research.

Instead of attempting to locate the item online alone by reviewing multiple web-pages on the Internet, the second buyer 505b instead wirelessly retrieves/receives information about the shopping history of the first buyer 505, including the transaction performed by the first buyer 505 to purchase the item of interest 520a (as described above with reference to FIGS. 1-4), to assist the second buyer 505b with purchasing the same item 520a.

For example, if the second buyer 505b is interested in purchasing goods 520a, or the same services 525 already purchased by the first buyer 505, then the second buyer 505b may interact with or run a software application located on the memory 555b.

Once the application is run, the second computing device 507b may then interrogate the memory 555a of the first computing device 507a to obtain the shopping history of purchased items of the first buyer 505. The second computing device 507b receives the shopping history, or a portion thereof, and may use the history stored on the memory 555a to purchase the same item from the vendor 510a, or alternatively from the first buyer 505.

In one aspect, the second buyer 505b accesses memory 555a of the first computing device 507a to interrogate and retrieve shopping history information for the desired item. The second buyer 505b uses the shopping history information to then purchase the item from seller 510a from memory 555a. The second buyer 505b may access memory 555a of the first computing device 507a across a wireless link 560c. The second Internet buyer 505b can then use a hyperlink to purchase the item 520a from seller 510a through either the first computing device 507a or through the second computing device 507b along links 590a, 590b, or 590c. The purchase can be made using a secure browsing application. In another embodiment, the purchase can be made using a message sent to the Internet seller 510a via links 590c, 590a, or by links 590b, 590c. Preferably, the wireless interface 560b communicates with the seller 510a to order the selected item 520a. Communication can be accomplished along a bi-directional communication path 590a, 590c using the Internet, or any other communication path.

It should be appreciated that, in one embodiment, the second buyer 505b may retrieve/obtain transactional information from the first buyer 505, and then the second buyer 505b may purchase the goods 520a or services 525a directly over a first wireless link 590b via the Internet over a second wireless link 590c to the vendor 510a and pay the vendor 510a directly or, alternatively, use a payment provider (not shown). In another embodiment, the second buyer 505b may obtain shopping history and transactional information from the first buyer 505. Then, the second buyer 505b may purchase the goods 520a or services 525a directly from the first buyer 505 over the first wireless link 590b to the Internet and over a third wireless link 590a to the first buyer 505 (who beforehand purchased the goods 520a from the seller 510a).

In another embodiment, the second Internet-based buyer 505b can buy the goods/services 520a/525a from the first buyer 505 but then pay the first buyer 505 who then later pays the seller 510a. Payment to the vendor 510a may be accomplished using a telephone service provider. In this aspect, payment and referral fees for desired goods or services can be accomplished by invoicing or crediting the monthly invoice related to the mobile phone subscription plan of the devices 507a, 507b. Various invoicing configurations are possible and within the scope of the present disclosure. It should be appreciated that in the form of digital content, no shipper is required, and the content may be downloaded in an immediate manner.

It is appreciated that in the interest of security, valuable personal information (such as credit card payment information) is not available to other unauthorized parties, such as the second Internet-based buyer 505b, and is restricted from access. This information may be restricted using a hardware- or software-based information technology security device, which is known, and which may format the computing devices 507a, 507b with zones of restricted access and zones that permit access.

Figure 6:
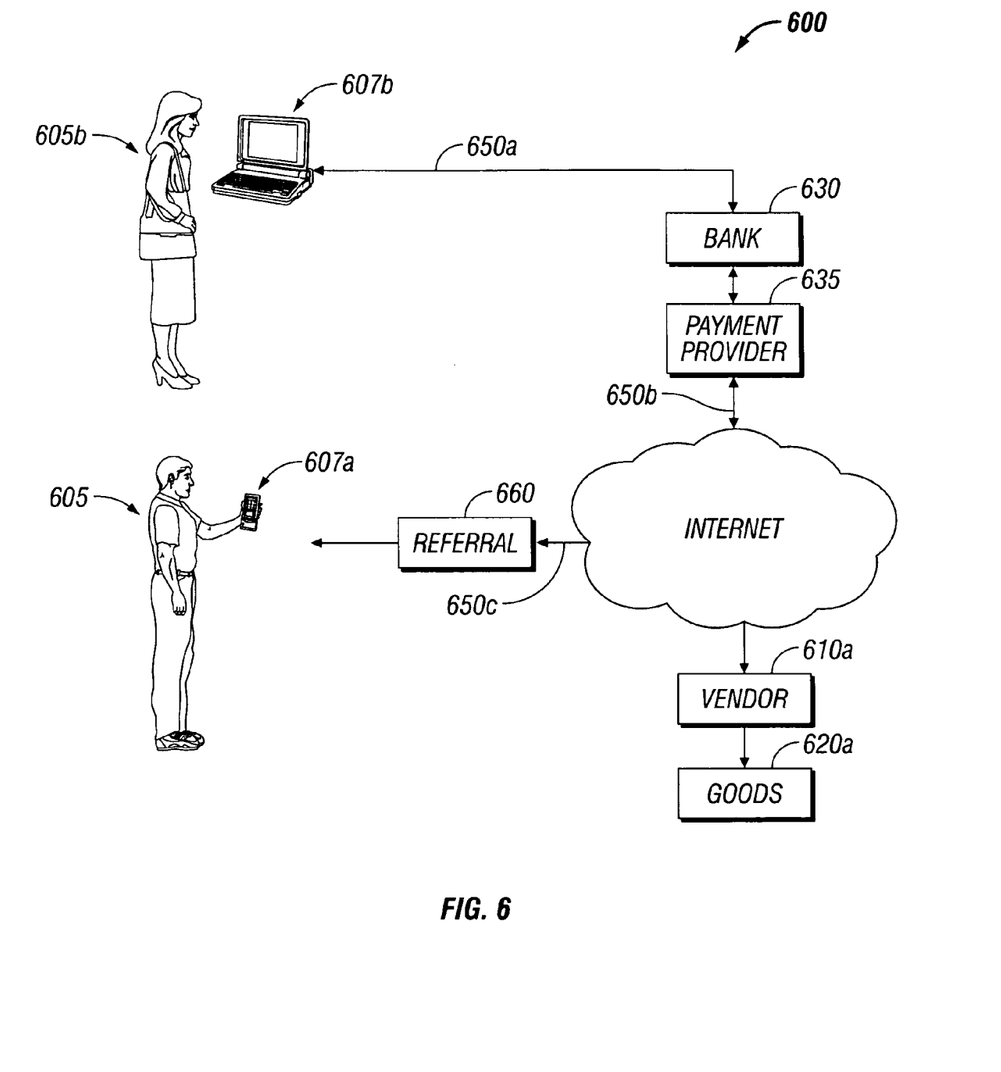
FIG. 6 shows a subsequent purchase and a second Internet-based buyer instructing a bank to transfer funds to the payment provider, and the funds being transferred to the Internet-based vendor with a referral fee being paid to the first Internet-based buyer.

FIG. 6 illustrates an example method 600 of a second buyer 605b, that has already accomplished a wireless purchase order according to one of the already discussed methods, making payment. The second buyer 605b communicates 650a a message to a bank 630 or payment provider 635 to transfer funds in order to pay for the goods 620a. The payment provider 635 then pays 650b the Internet-based seller 610a for the goods 620a or, alternatively, provides an authorization for a later payment.

Further, the payment provider 635 may pay 650c a referral electronic payment 660 or bonus to the first buyer 605 in exchange for referral of the second Internet buyer 605b to the vendor 610a by the first buyer 605 and the subsequent sale made by the vendor 610a to the second Internet buyer 605b.

The referral 660 may be a cash payment that is a fixed one time payment or a percentage of the total purchase price of the item 620a. In another embodiment, the referral 660 may be a bonus or a set percentage calculated from the total number of referred orders when there are multiple referred orders to the seller 610a. More particularly, after a certain predetermined number of referrals 660, the first buyer 605 may be conferred a benefit, such as, for example, a free item or an item at reduced cost from the Internet-based seller 610a or from a different Internet seller (not shown). In yet another example embodiment, the referral 660 may include airline miles whereupon a free airline transportation ticket may be received by the first buyer 605 (after a certain number of miles are accrued, such as twenty thousand miles) in exchange for the referral and subsequent sale to the second buyer 650a. Various non-cash referral configurations, and benefits are possible and within the scope of the present disclosure.

Figure 7:
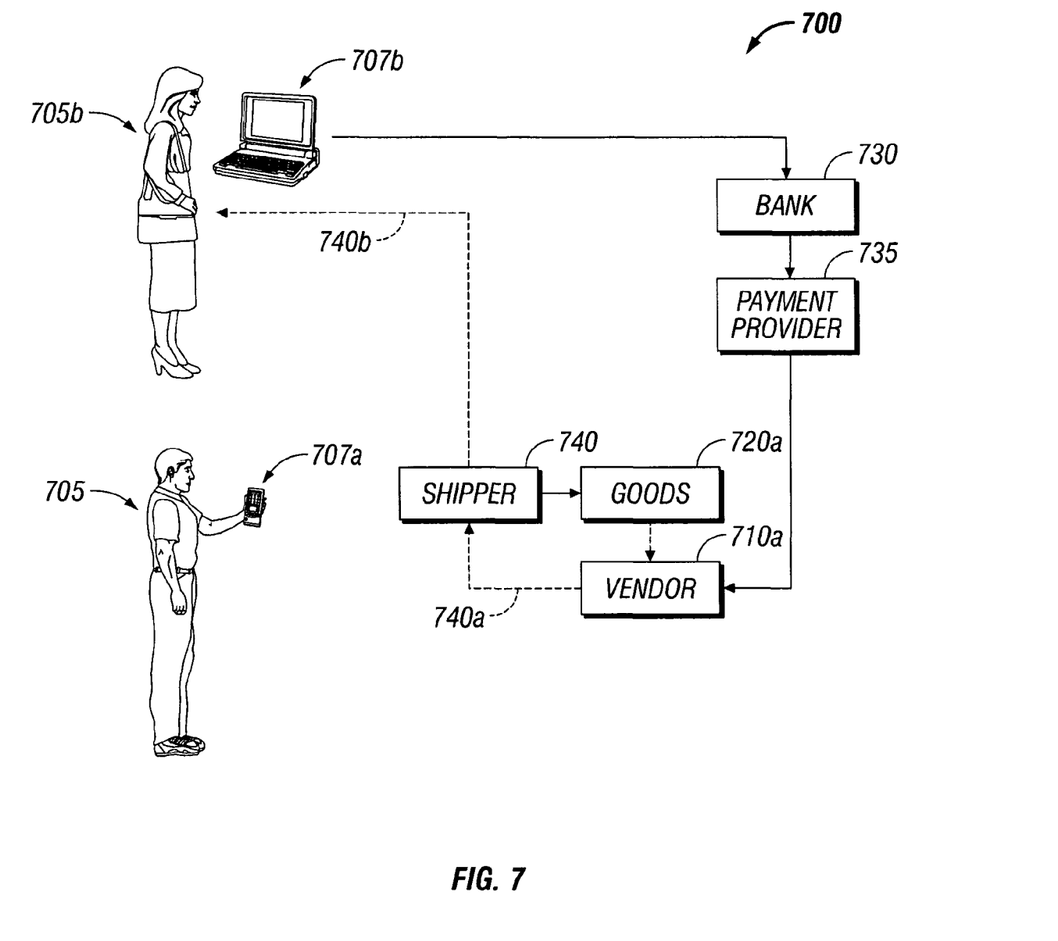
FIG. 7 shows the Internet-based vendor accepting the funds and communicating to a shipper to deliver the goods to the second Internet-based buyer to complete the transaction, and the second mobile computing device automatically recording the cost and the source for the transaction for a third Internet-based buyer to be used in a future potential transaction.

FIG. 7 illustrates an example method 700 of shipping purchased goods 720a according to the present invention. An Internet-based vendor 710a delivers 740a the purchased item 720a to a shipper 740. The shipper 740 then delivers the item 720a to a second buyer 705b. A second mobile computing device 707b will then save shopping data in the shopping history. This includes parameters of the shipment saved to the second memory (as illustrated in FIG. 5), which also includes data about the source, cost, time of delivery, or any other e-commerce parameters relating to the goods that are necessary to securely replicate a favorable transaction at a later date as previously discussed or to record negative attributes to dissuade a future transaction.

Figure 8:
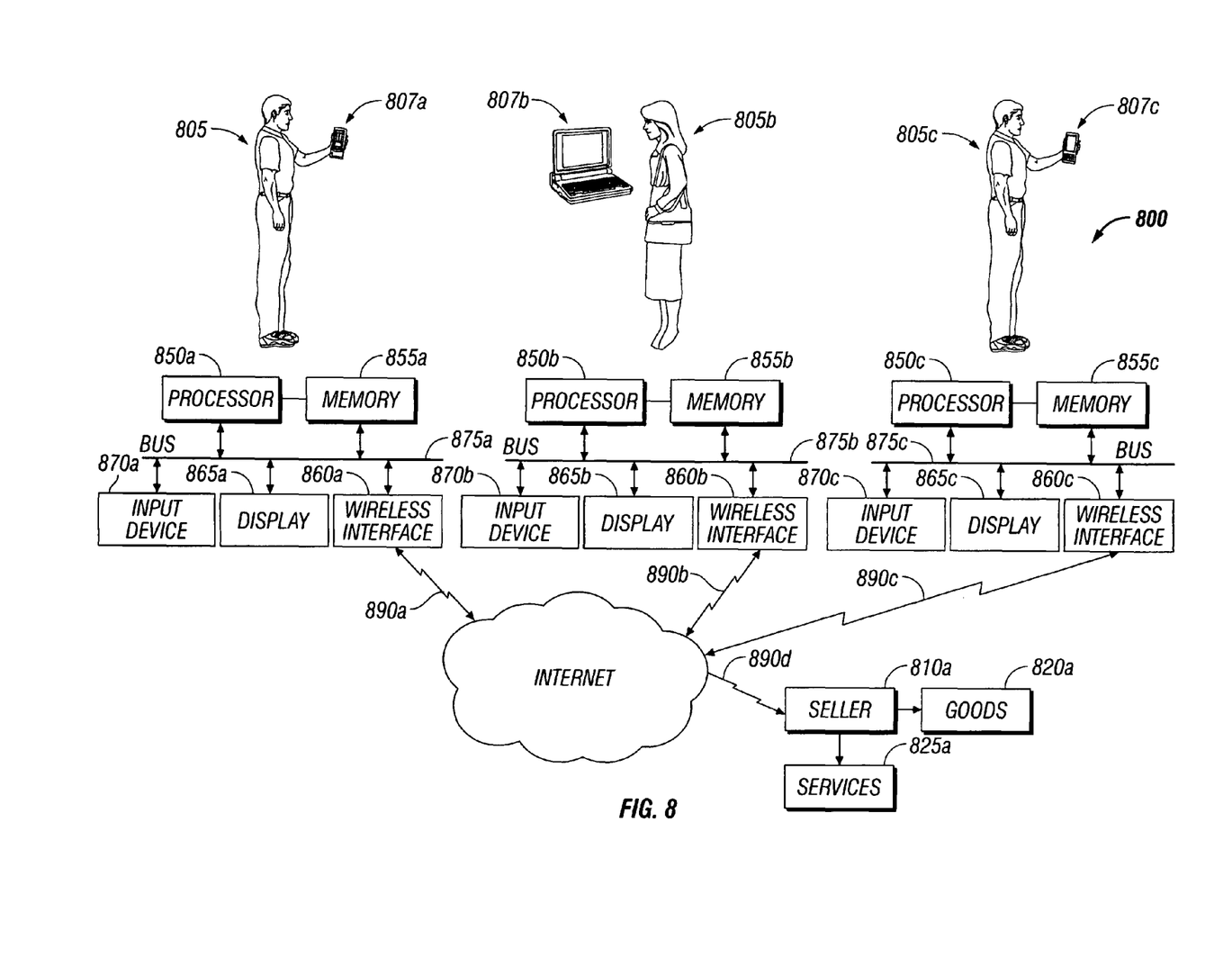
FIG. 8 shows a later stage schematic of the transaction where the third Internet-based buyer purchases an item from the second Internet-based buyer's database information and history and the second Internet-based buyer receives the referral fee.

FIG. 8 illustrates an example embodiment of referral, as described above and according to the present invention, extended to multiple other referred buyers. A third Internet buyer 805c also carries a third mobile computing device 807c with a third processor 850c, a third memory 855c, and a third wireless interface 870c connected to a bus 875c. The third Internet buyer 805c also may not wish to spend excessive amounts of time and energy reviewing Internet web-pages or browsing through multiple offers in an attempt to seek out the best prices and highest quality merchant based on the available information. The third Internet buyer 805c may then purchase a similar designated item from the Internet seller 810a based on a recommendation by a second Internet buyer 805b.

For example, the third Internet buyer 805c, which may be a different individual or entity relative to the first and the second Internet buyers 805 and 805b, may learn that the second Internet buyer 805b is satisfied with the transaction with the Internet vendor 810a. The third Internet buyer 805c may also be similarly motivated. The third Internet buyer 805c may interrogate (using a mobile computing device 807c) a memory 885b of a second mobile computing device 807b to interrogate/retrieve a shopping history of items that the second Internet buyer 805b has purchased. This interrogated shopping history is used to purchase an item 820a, simply to seek information about the item 820a for a later purchase, or to seek information to accept/decline an offer to purchase.

This purchase can be accomplished from the third Internet buyer 805c purchasing the item 820a (i) from the second Internet buyer 805b over a first wireless link 890c from the third buyer 805c to the Internet and a second wireless link 890b from the Internet to the second buyer 805b, or (ii) by purchasing from the first buyer 805 over the first wireless link 890c from the third buyer 805c to the Internet and a third wireless link 890a from the Internet to the first buyer 805. Alternatively, (iii) the third Internet buyer 805c may purchase the item from the Internet seller 810 over the first wireless link 890c to the Internet and over a fourth wireless link 890d from the Internet to the seller 810a. There also may be wireless links between wireless interfaces the 860a-860c (not shown).

Figure 9:
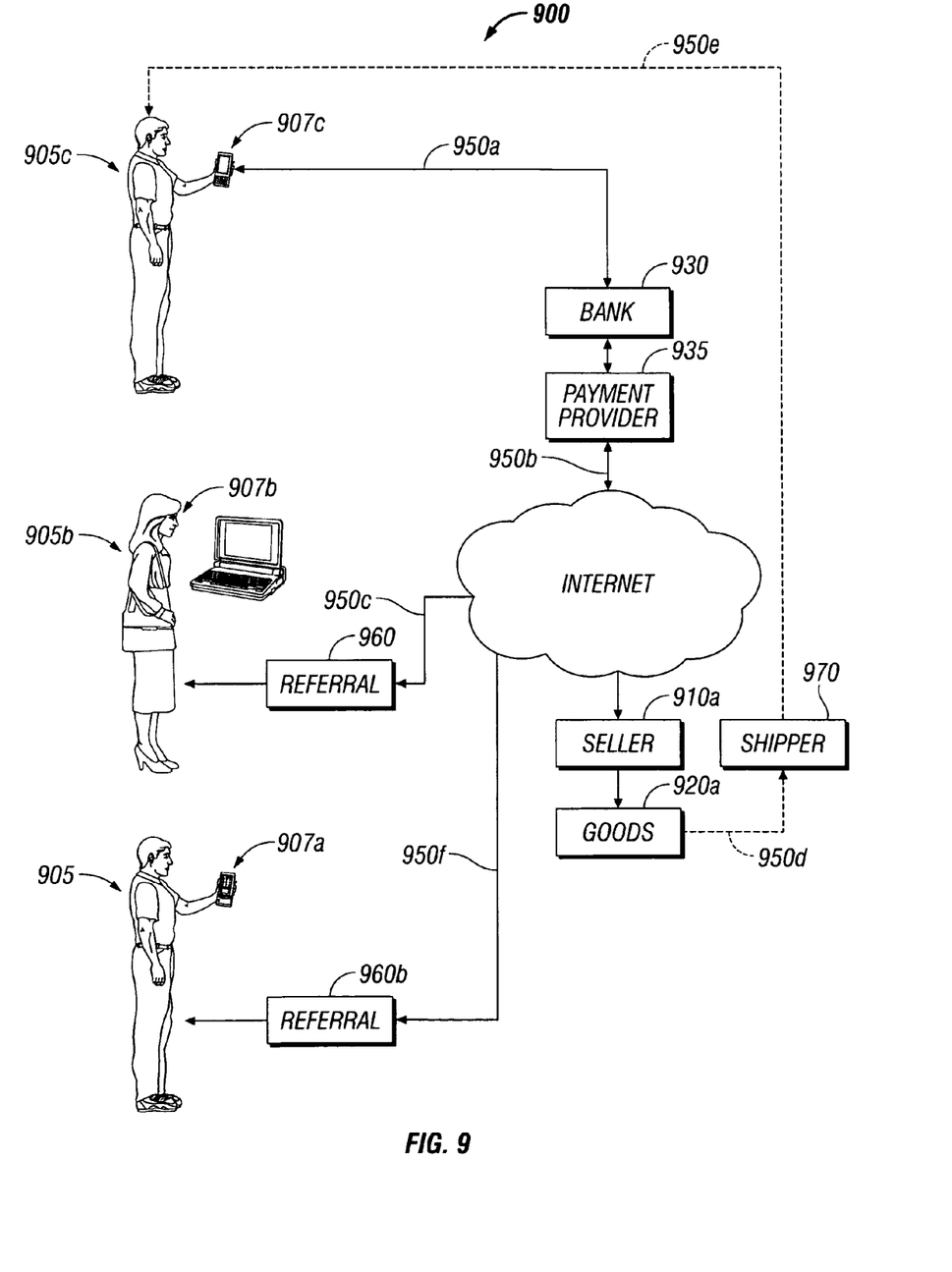
FIG. 9 shows a payment of the referral fee to the second Internet-based buyer of FIG. 8.

FIG. 9 illustrates a method 900 according to the present invention whereby a referral may be paid to a second Internet buyer 905b. Once an item 920a has been ordered, a third Internet buyer 905c communicates a message (950a) to a bank 930 or payment provider 935 to transfer funds in order to pay for the goods 920a. The payment provider 935 may then pay the Internet seller 910a for the goods 920a or, alternatively, may provide an authorization for a later payment (950b).

Further, the payment provider 935 or bank 930 may pay (950c) a referral payment 960 or bonus to the second Internet buyer 905b for referring the sale. Thereafter, the item 920a may be shipped (950d) from the Internet-based vendor 910a to the shipper 970, and then the shipper 970 may transfer (950e) the goods 920a to the third Internet buyer 905c.

As previously described, payment to the vendor 910a may be accomplished using a mobile phone service provider. In this aspect, payment and referral fees for desired goods or services can be accomplished by invoicing or crediting the monthly invoice related to the mobile phone subscription plan of the devices.

A second referral fee 960b also may be paid. The second referral fee 960b may be paid from the funds transferred (950b) from the bank 930 or payment provider 935 to the Internet seller 910a, or from the third buyer 905c to the seller 910a. Funds may be also paid (950f) to the first buyer 905. This method 900 may repeat for referral purchases/sales between the third buyer 905c, a fourth buyer (not shown), a fifth buyer (not shown), a sixth buyer (not shown) or more buyers with a referral fee being paid to the individual that referred the sale of items 920a to Internet seller 910a, and possibly to other previous successful referring parties. It is also appreciated that the present method 900 also provides that a shared royalty or referral fee may be paid to both the first Internet buyer 905 and the second buyer 905b for multiple referrals or by an agreement to share the referral fee.

While this invention has been particularly shown and described with references to example embodiments thereof, it will be understood by those skilled in the art that various changes in form and details may be made therein without departing from the scope of the invention encompassed by the appended claims.

It should be appreciated that the buyer may be an individual or other entity such as, for example, a small business, a partnership, or any other entity known in the art. Further, it should be appreciated that the present method includes commerce wherein goods, services, and digital content may be bought and sold and, in the case of digital content and services, a shipper may not be required and the digital content may be exchanged/transferred in a rapid manner over a communications network.

Further, each of the Internet sellers can be the same entity or a different entity, such as, for example, an Internet-based business, such as, AMAZON.COM®, WALMART.COM®, DEALTIME.COM®, OVERSTOCK.COM®, 800FLOWERS.COM®, EBAY.COM®, or any other commercial Internet-based website, or Internet-based portal known in the art for either selling goods, services, or digital content.

Each vendor may include multiple parties that sell items on the same Internet-based website, and the present disclosure is not limited to one entity as a vendor. The present method is not limited to commercial Internet websites, and the vendors also may include some individual commerce websites, such as, for example, individuals selling using EBAY®, individuals placing listings on CRAIGSLIST.COM®, FROOGLE.COM®, personal websites, local e-commerce sites, local commerce sites, local delivery establishments on the web, or any other individuals or entities associated with an Internet website that is enabled for e-commerce. Sellers may include sellers of original content, and/or resellers of digital content, such as APPLE® I-TUNES®, or APPLE TV®, NETFLICKS.COM®, BLOCKBUSTER.COM®, AMAZON, or any site associated with digital content.

The goods or content may be clothes, such as, designer jeans, or music and the buyer may select (using an input device of the mobile computing device). These may include, for example, a pair of designer jeans, clothes, or electronic equipment having a sales price from a specific page.

It should be appreciated that the items are not limited to physical items, such as goods, but may also include other types of items, such as digital content. Music, software programs, program instructions, readable or executable code, television shows, personal digital content, photographs, screen savers, television recorded programs, movies, downloadable programs, applications, television commercials, television episodes, so called "mini-sodes" (which are abridged forms of digital content, such as a thirty minute shows which are reduced for display in a quick manner, such as five minutes), movie trailers, text, books, e-books, instructional videos, language instructions, educational materials, graphics, video, audio, ring tones, commercials, or any other digital content known in the art may be used and is within the scope of the present disclosure. Various digital content configurations are possible and within the scope of the present disclosure. It should be appreciated that this digital content can be purchased or sold in an impulse manner with payment being invoiced using a monthly invoice associated with the cellular service provider.

Some of the Internet sellers may be involved in transactions with real property, and the present method is intended to encompass selling real estate, time shares, apartments, listing rentals, offering real property for sale or lease. Various electronic commerce applications are possible and within the scope of the present disclosure, and the present method is not limited to any specific type of goods, property or service, and may further encompass employment services, and fees associated with placing qualified individuals in suitable employment positions, such as listing with newspapers, CRAIGSLIST.COM®, or employment sites.

For example, various mobile computing devices are known in the art, and example embodiments of the present invention are intended to encompass all mobile computing devices that may be used for mobile commerce, such as, for example, a laptop computer, desktop computer, mobile telephone, cellular telephone, Personal Digital Assistant (PDA) with a wireless Internet connection, PALM® TREO™ smartphone device, BLACKBERRY® devices, SONY® devices, MOTOROLA® mobile communication devices, NOKIA® communication devices, Wi-Fi™ enabled devices, electronic mail communication devices, smartphones, or any other mobile computing suitable for wireless operation and electronic commerce, such as those that are enabled for running e-commerce software applications, and is not limited to any specific device.

The mobile computing device may have an operating system, such as one of various known operating systems, including MICROSOFT WINDOWS MOBILE®, SYMBIAN® OS mobile operating system, APPLE® OS X, a BLACKBERRY® operating system, a PALM® OPERATING SYSTEMS, a GOOD TECHNOLOGY® operating system, LINUX®, or any other operating systems, including those operating systems compatible with MICROSOFT INTERNET EXPLORER®, OPERA®, MOZILLA FIREFOX®, NETSCAPE® NAVIGATOR, or any other operating system known in the art to be used in connection with wireless operation and electronic commerce.

The credit, payment or debit provider may be any entity suitable for an electronic payment over the Internet known in the art, such as cash, checks, credit cards, debit cards, gift cards, PAYPAL®, or other similar entities for electronic payment over the Internet, including payment and escrow services.

Shipment can be accomplished by known overnight shipping providers for electronic commerce, such as FEDERAL EXPRESS®, UNITED PARCEL SERVICE OF AMERICA, UNITED STATES POSTAL SERVICE, DHL®, etc., or other third parties, and can even be accomplished directly by the vendor.

The present disclosure is directed to a method for a wireless purchase of items from a remote Internet-based vendor across the Internet using a Hyper Text Transfer Protocol (HTTP) or similar request/response protocol between clients and servers. The method uses a mobile computing device, and a payment provider, such as, for example, a payment, credit or debit provider, and a shipper to transport the purchased items. The mobile computing device purchases in a wireless manner when the Wi-Fi™ enabled device is in close proximity to an access point or a wireless hot spot.

It should be appreciated that the software application of mobile computing device records substantially all of the parameters of the transaction in a local or remote memory for future retrieval and later use. In an alternative embodiment, the information may be stored on an electronic payment device, such as a credit card, or contact-less payment device known in the art having a memory.

What is claimed is:

1. A business method for selling in a wireless manner, the business method comprising:
   transmitting, over a wireless interface, a request to a first wireless device from a second wireless device, the request from the second wireless device representing a request for access by the second wireless device to information stored by the first wireless device, the information including a shopping history from a purchasing history of an entity associated with the first wireless device;
   receiving, over the wireless interface, a response to the request, the response including an identification of a vendor and an identification of a cost associated with items associated with the shopping history, the identification of vendor providing a hyperlink to at least one vendor across the Internet associated with each item in the shopping history;
   receiving, from an entity associated with the second wireless device, selection of a designated item by an entity associated with the second wireless device from the shopping history;
   sending, from the second wireless device to the vendor device indicated by the hyperlink, a request to purchase the designated item;
   electronically transferring funds from the entity associated with the second wireless device to the vendor; and
   electronically paying a referral fee to the entity associated with the first wireless device.

2. The business method of claim 1, further comprising electronically transferring funds to the vendor through a payment provider.

3. The business method of claim 1, further comprising electronically paying the referral fee through a payment provider.

4. The business method of claim 1, further comprising calculating the referral fee from a total sale amount of the item.

5. The business method of claim 1, further comprising electronically requesting delivery of the item from the vendor to the entity associated with the second wireless device through a shipper or by a download of content, the shipper being different from the vendor, the first entity, and the second entity.

6. The business method of claim 1, further comprising:
   purchasing a second designated item by an entity associated with a third wireless device from a second shopping history stored by the second wireless device;
   sending a message requesting delivery of the item from the vendor to the entity associated with the third wireless device;
   electronically transferring funds from the entity associated with the third wireless device to the vendor; and
   electronically paying a second referral fee to the entity associated with the second wireless device.

7. The business method of claim 1, further comprising automatically storing the shopping history in the first wireless device from the purchasing history of the entity associated with the first wireless device.

8. The business method of claim 1, further wherein the shopping history comprises a parameter of at least one of personal property, real property, and services.

9. The business method of claim 1, further comprising:
   storing the shopping history in the first wireless device includes storing information concerning at least two vendors including parameters with a higher cost vendor and a lower cost vendor for the same item.

10. The business method of claim 1, further comprising:
    electronically transferring funds from the entity associated with the second mobile device to the entity associated with the first mobile computing device for purchase of the item;
    electronically deducting the referral fee from the funds; and
    electronically delivering a remainder of the funds to the vendor.

11. The business method of claim 1, wherein the shopping history comprises at least one of graphical information, audio information, textual information, a hyperlink, metadata, and any combination thereof.

12. The business method of claim 1, further comprising deriving the referral fee from funds transferred from the entity associated with the second mobile device to the vendor.

13. The business method of claim 1, further comprising electronically paying the referral fee only after at least two different purchases.

14. The business method of claim 1, further comprising electronically paying the referral fee only after a predetermined number of transactions.

15. The business method of claim 1, further comprising electronically sharing the referral fee.

16. The business method of claim 1, further comprising:
    electronically waiving the referral fee; and
    electronically reducing, if waived, the purchase price of the designated item owed by the entity associated with the second mobile device to the vendor.

17. The business method of claim 1, further comprising:
    electronically recording the referral fee; and
    electronically applying the recorded referral fee as a discount on a future purchase between the entity associated with the first mobile computing device and the vendor.

18. The business method of claim 1, further comprising:
    electronically applying the referral fee as a credit to a future purchase between the entity associated with the first wireless device and the vendor;
    electronically the credit to a predetermined sum; and
    electronically providing the entity associated with the first wireless device with a benefit when the credits meet or exceed the predetermined sum.

19. The business method of claim 1, further comprising encrypting communications between the first wireless device and the entity associated with the second wireless device.

20. The business method of claim 1, further comprising encrypting communications between the first wireless device, and the second wireless device, and the vendor device.

21. The business method of claim 1, further comprising sending data product reviews relating to the items from the first wireless device and the entity associated with the second wireless device.

22. The business method of claim 1, the first wireless device is a different type of device relative to the second wireless device.

23. The business method of claim 1, wherein the first wireless device, or the second wireless device comprise at least one of:
    a mobile phone, a mobile electronic mail retrieval device, a Personal Digital Assistant, a Smartphone, a notebook computer, and an electronic payment device.

24. The business method of claim 1, further comprising electronically providing a receipt itemizing the transaction.

25. The business method of claim 1, further comprising electronically signing the transaction.

26. The method of claim 1 wherein the item comprises digital content, further comprising:
purchasing a designated content file by an entity associated with the second wireless device from the content history, by accessing the first memory via the first and second wireless interfaces, to enable the second mobile device to select a content file in the content within the first memory of the first mobile computing device; and
downloading the content file to the second mobile computing device.

27. The method of claim 26 wherein the digital content is selected from the group consisting of music files, video files, audio files, text, instructional videos, television episodes, movies, abridged content, program instructions, applications, business applications, data, and any combination thereof.

28. A system used in connection with a wireless communication network comprising:
a first mobile computing device having a first processor, a first memory, and a first wireless interface;
a second mobile computing device having a second processor, a second memory, and a second wireless interface;
the first memory storing a shopping history recorded from a purchasing history of an entity associated with the first mobile device, or the first memory including a link to obtain the shopping history from a remote network;
the purchasing history further providing information relating to one or more past transactions performed by the first wireless device including at least an identification of a vendor and an identification of cost of an item in the shopping history;
the second mobile device configured to send a request message over the second wireless interface to the first wireless interface, the request message requesting the first mobile computing device to obtain the shopping history as stored in the first memory;
the second mobile device then receiving a response message over the second wireless interface from the first wireless interface;
the response message including information relating to a past transaction performed by the first wireless device;
the second mobile device further configured to communicate a purchase transaction message to a third computing device associated with the vendor; and
the purchase transaction message representing a request configured to:
(i) deliver the item from the vendor associated with the third computing device to an entity associated with the second mobile computing device;
(ii) initiate transferring funds electronically from the entity associated with the second mobile computing device to the vendor; and
(iii) initiate paying a referral fee electronically to the entity associated with the first mobile computing device.

29. The system of claim 28, wherein the first mobile computing device, or the second mobile computing device comprise at least one of a mobile phone, a mobile electronic mail retrieval device, a Personal Digital Assistant, a Smartphone, a notebook computer, or an electronic payment device.

30. The system of claim 28, wherein the third computing device is associated with a vendor website on a server.

31. The system of claim 28, further comprising a payment provider configured to electronically transfer funds from the entity associated with the second mobile computing device to the vendor.

32. The system of claim 28, further comprising a payment provider configured to electronically pay the referral fee to the entity associated with the first mobile computing device.

33. The system of claim 28, further comprising a shipper configured to electronically receive a request to ship the item to the entity associated with the second mobile computing device, or in the case of digital content further comprising program instruction to initiate a download of the digital content.

34. A business method for mobile commerce comprising:
purchasing an item from a Internet-based vendor by a second mobile computing device associated with a second mobile consumer, using information previously stored by a first mobile computing device and received over a direct wireless link between the first mobile computing device associated and the second mobile computing device; and
electronically transferring funds to the vendor with at least some of the funds being electronically transferred to the first mobile consumer as a referral fee.

35. The method of claim 34, further comprising paying the referral fee by invoicing a mobile phone subscription plan associated with the mobile computing device associated with the first mobile consumer.

36. The method of claim 34, wherein the item is digital content.

37. The method of claim 36, wherein the digital content is selected from the group consisting of video, audio, text, instructional videos, an e-book, music, a movie, an episode, a digital file, a commercial, or any combination thereof.

* * * * *

UNITED STATES PATENT AND TRADEMARK OFFICE
CERTIFICATE OF CORRECTION

| | | |
|---|---|---|
| PATENT NO. | : 8,812,399 B2 | Page 1 of 1 |
| APPLICATION NO. | : 12/152458 | |
| DATED | : August 19, 2014 | |
| INVENTOR(S) | : Jeffrey J. Jacobsen | |

It is certified that error appears in the above-identified patent and that said Letters Patent is hereby corrected as shown below:

In the Claims

In Claim 22, Column 12, line 59, please insert:

--further comprising providing that-- after "The business method of Claim 1," and before "the first wireless device is a different type of device relative to the second wireless device."

In Claim 26, Column 13, line 11, please insert:

--stored-- after "content file in the content"
and before "within the first memory"

Signed and Sealed this
Twenty-third Day of December, 2014

Michelle K. Lee
*Deputy Director of the United States Patent and Trademark Office*